May 5, 1970 L. F. OTTENS 3,510,605

AUDIO-VIDEO MAGNETIC TAPE MAGAZINE INCLUDING TRANSDUCERS

Filed May 3, 1967 4 Sheets-Sheet 1

INVENTOR.
LODEWIJK F. OTTENS
BY
Frank R. Trifari
AGENT

INVENTOR.
LODEWIJK F. OTTENS
BY
Frank R. Trifari
AGENT

May 5, 1970 L. F. OTTENS 3,510,605

AUDIO-VIDEO MAGNETIC TAPE MAGAZINE INCLUDING TRANSDUCERS

Filed May 3, 1967 4 Sheets-Sheet 3

INVENTOR.
LODEWIJK F. OTTENS
BY
Frank R. Trifari
AGENT

AUDIO-VIDEO MAGNETIC TAPE MAGAZINE INCLUDING TRANSDUCERS

Filed May 3, 1967 4 Sheets-Sheet 4

INVENTOR.
LODEWIJK F. OTTENS
BY
AGENT

United States Patent Office 3,510,605

Patented May 5, 1970

3,510,605

AUDIO-VIDEO MAGNETIC TAPE MAGAZINE INCLUDING TRANSDUCERS

Lodewijk Frederik Ottens, Emmasingel, Netherlands, assignor to U.S. Philips Corporation, New York, N.Y., a corporation of Delaware Filed May 3, 1967, Ser. No. 635,763
Claims priority, application Netherlands, May 7, 1966, 6606263; Mar. 15, 1967, 6703877
Int. Cl. G11b *21/04, 23/04, 15/24*
U.S. Cl. 179—100.2 10 Claims

ABSTRACT OF THE DISCLOSURE

A magazine contains a magnetic tape which is transportable between two spools. The tape follows a path around a guiding drum which drum is an integral part of the magazine. Magnetic heads are positioned along this path and also within the drum for the transducing of audio and/or video signals.

This invention relates to a magnetic tape magazine or cassette for recording and playback of sound and/or video signals. The tape having a magnetizable layer for recording, reproducing and/or erasing electric signals, is contained within an exchangeable magazine having a base, a lid and side faces which accommodates winding-up and winding-off spools, driving and guiding members for the tape and which is also provided with mechanical devices which upon introduction of the magazine into said apparatus are coupled with one or more winding-up and winding-off devices and guiding and/or driving members for the tape. The magazine is exchangeable in the sense that it is designed to be inserted and removed, with the tape contained therein, from the recording and playback apparatus.

This type of magnetic apparatus with associated exchangeable magazines is known and has proved very satisfactory in the area of sound recording and reproducing. Furthermore, pre-recorded tapes are commercially available and stored in magazines or cassettes which can be played back without complicated mounting operations which are often difficult to carry out for unskilled persons.

This invention broadens the scope of cassette recording and play back by including video signals and increases their compatibility, i.e. previous visual recordings made on one apparatus could not be played back on another apparatus because of the differences in tolerances during manufacture of the tape guiding drums with respect to the diameter and the unroundness of the drum. For the recording, playing back and/or erasing of video signals and magazine accommodates a helical guiding device which comprises two aligned drum halves guiding the tape along a helical path and defining a slit, within which one or more magnetic heads are adapted to rotate and scan the tape.

In one embodiment of the invention, the spool axes, the guiding and/or driving members for the tape are parallel to each other and at right angles to the base of the magazine, while the axes of the drum halves are at an acute angle to said base.

In an alternative embodiment of the invention, the aligned axes of the drum halves may be parallel to the spool axes, while the axes of the guiding and/or driving members for the tape lying, in the travelling direction of the tape, immediately before and behind the drum halves are at an, as the case may be adjustable, angle to the drum- and spool axes.

A light-weight, strong and economical magazine can be obtained if, according to a further embodiment of the invention, the magazine is manufactured from a synthetic resin metal-plated entirely or in part and consists of two halves separated by a longitudinal seam, each drum half and tape-guiding members and supporting shafts, if any, being secured to one half of the magazine.

The cost price of the magazine can be further reduced if, according to a further feature of the invention, each drum half with guiding member or members and supporting shaft or shafts, if any, is integral with one half of the magazine.

The video head is adapted to rotate in the gap between the drum halves. A special journalling of the head-holder is usually required; this journalling can be avoided if, according to a further feature of the invention, the video head is placed in a sledge enclosed between the two drum halves and adapted to rotate between said halves.

According to a further aspect of the invention, the magnetic apparatus is provided with a driving disc having a proturberance which can co-operate with a cam on the sledge.

The head disposed on the sledge must be electrically connected with the magnetic apparatus. A simple construction is obtained if, according to an embodiment of the invention, the driving disc also supports electric contacts which can co-operate with the head.

It may often be advantageous and even necessary to electrically separate the video head, when it stands still, from the remaining part of the magnetic apparatus. It is moreover desirable, with a view to the balancing of the driving disc, that the contacts are as light as possible and cannot be damaged.

For this purpose, according to a feature of the invention, the contacts are resilient and they bear on or in the driving disc when said disc stands still, and when the disc rotates, they are pressed against electric contacts of the head due to the centrifugal forces.

The invention will be described with reference to the drawing which shows a few embodiments of a magazine to be used in a magnetic apparatus according to the invention and in which.

Figure 1:
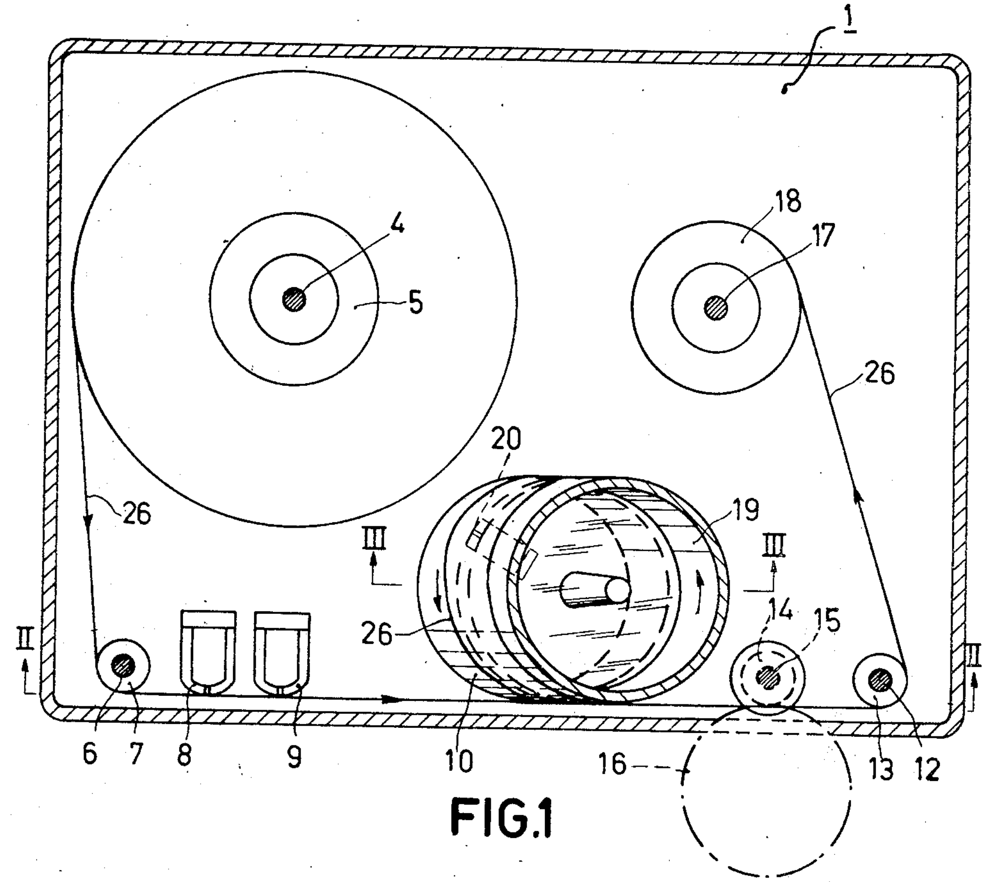
FIG. 1 is a diagrammatic sectional view taken on the line I—I of FIG. 2 of a magazine.
Figure 2:
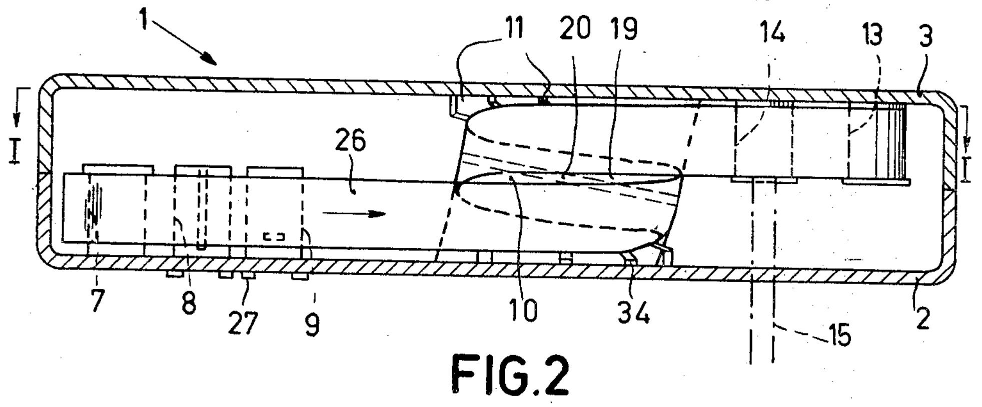
FIG. 2 is a sectional view taken on the line II—II of the magazine of FIG. 1.
Figure 3:
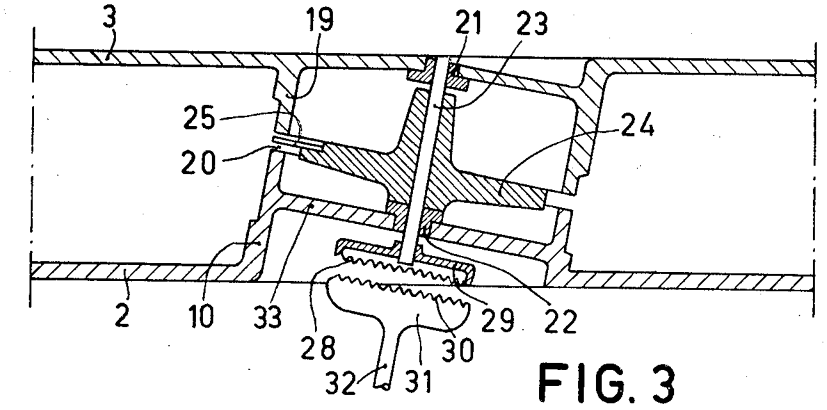
FIG. 3 is a sectional view of FIG. 1 taken on the line III—III, viewed in the direction of the arrow.
Figure 4:
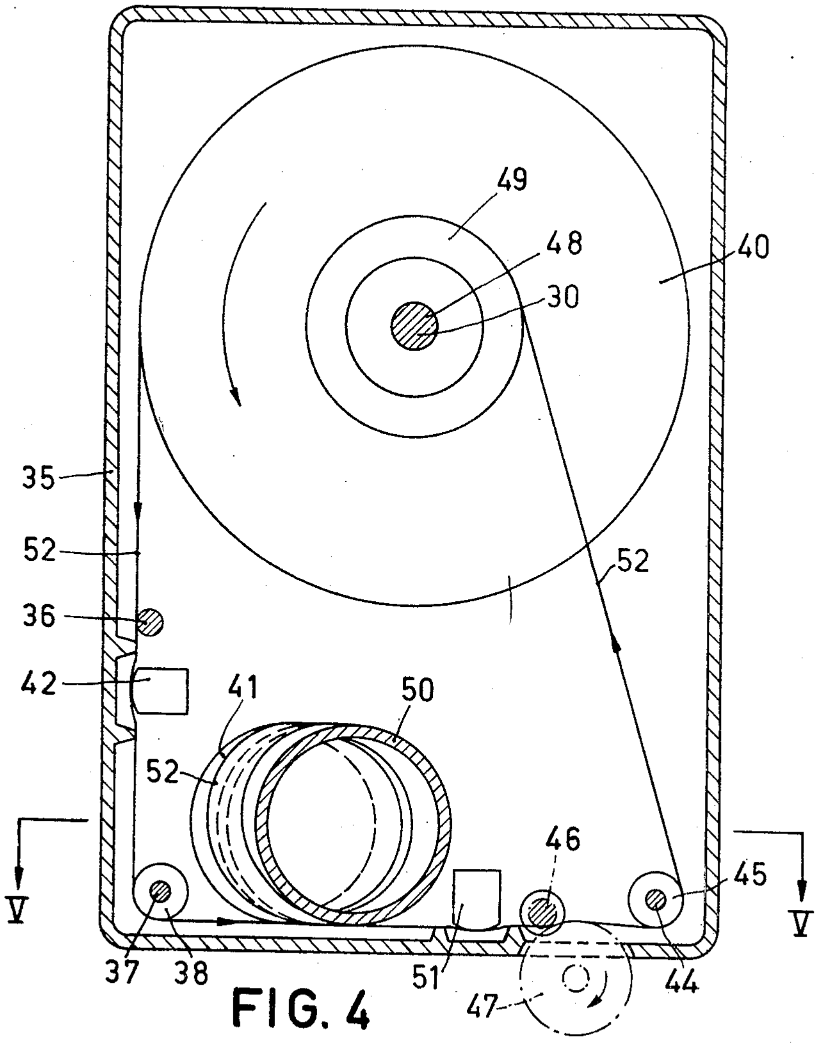
FIG. 4 is a diagrammatic sectional view taken on the line IV—IV of FIG. 5 of alternative embodiment of the magazine of FIG. 1.
Figure 5:
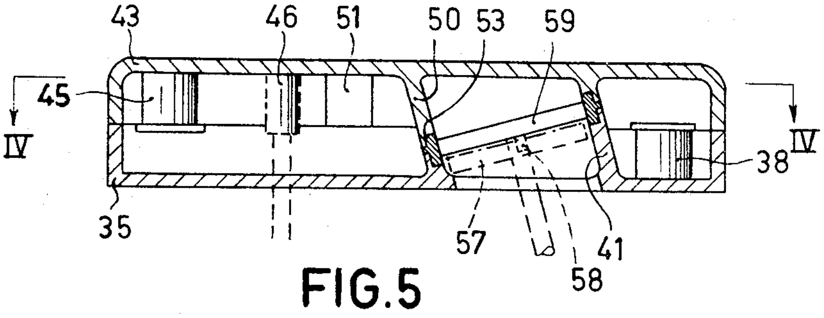
FIG. 5 is a sectional view of FIG. 4 taken on the line V—V, viewed in the direction of the arrow.
Figure 6:
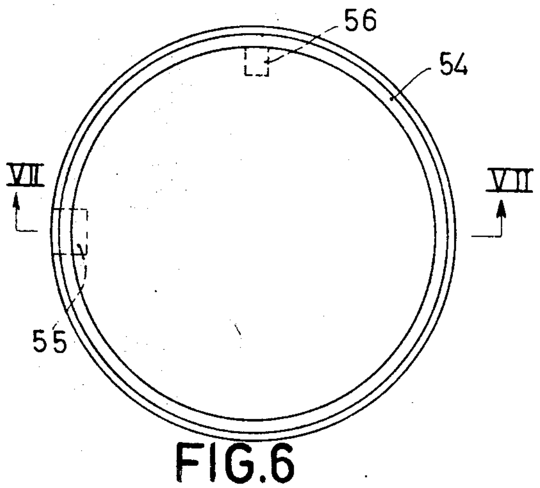
FIG. 6 is a plan view of a rotating head-holder of FIG. 5, shown on an enlarged scale.
Figure 9:
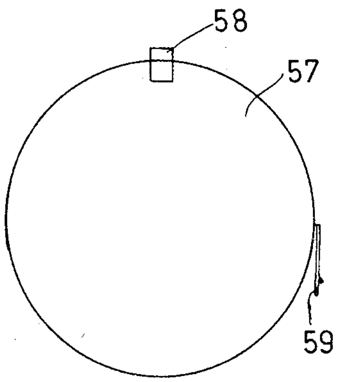
FIG. 9 is a plan view of a disc.
Figure 7:
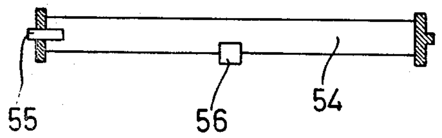
FIG. 7 is a sectional view of FIG. 6 taken on the line VII—VII, viewed in the direction of the arrow.
Figure 8:
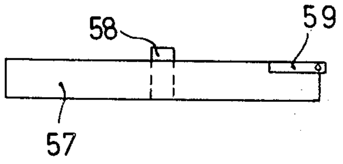
FIG. 8 is a side elevation of a driving disc.

Referring now to FIGS. 1, 2 and 3, reference numeral 1 denotes a magazine for a magnetic apparatus which consists of a box 2 and a lid 3. The box 2 is provided with a shaft 4 about which a spool 5 is adapted to rotate which may be provided with a brake (not shown). A guiding roller 7 rotatable about a shaft 6 and two magnetic heads 8 and 9 are also secured in the box. The head 8 acts, for example, as a head for erasing sound vibrations or video recordings; the head 9 can record and play back sound vibrations and/or synchronizing signals. Furthermore, the box 2 accommodates an obliquely arranged drum half 10 joined thereto and a few tape-guiding members 11.

In the lid 3 there is provided a guiding roller 13 rotatable about a shaft 12. A driving roller 14 adapted to rotate about a shaft 15 co-operates with a pressure roller 16 and these rollers are disposed in a magnetic apparatus (not shown). The rollers 14 and 16 are indicated in FIGS. 1 and 2, respectively, by dot-and-dash lines. The lid further has a winding-up spool 18 rotatable about a shaft 17. The lid has joined to it a drum half 19 the axis of which is in line with the axis of the drum half 10. The two drum halves are separated by a gap 20. The two drum halves are provided with bearings 21 and 22 in which a shaft 23 is adapted to rotate. This shaft 23 supports a disc 24 to which a magnetic head 25 is secured which is disposed in the gap 20. The head 25 can be used both for recording and playing back video signals. A tape 26 provided with a magnetizable layer extends from the spool 5 along the guiding roller 7 and the heads 8 and 9 in a helical loop around the two drum halves 10 and 19; the tape then extends along the driving roller 14 and the guiding roller 13 to the winding-up spool 18.

The box 2 is provided on its lower side with contacts 27 which are electrically connected with the heads 8 and 9.

The shaft 23 supports a disc 29 which is provided with teeth 28 and which co-operates with a disc 31 provided with corresponding teeth 30, the latter disc being disposed in the magnetic apparatus and being driven by a shaft 32.

The box 2 and the lid 3 are manufactured from synthetic resin by injection-moulding; the box, the shaft 6, the shaft 4 and the drum half 10 with a reinforcing wall 33 (FIG. 3) and the tape-guiding members 34 (FIG. 2) are obtained in one injection-moulding process. The lid 3, the shafts 12 and 17, the tape-guiding members 11 and the drum half 19 are also obtained in one injection-moulding process.

The contacts with the video head 25 may be incorporated into the discs 29 and 31.

It will be evident that recording of the video signals and scanning are performed in accordance with the "helical scan" method.

When the magazine described above is introduced into a magnetic apparatus provided with electrical connections for the contacts 27, a driving shaft 32 with a disc 31, a driving roller 14 and, if desired, shafts for driving the spools 5 and 18 and, for example, slip contacts or a rotating transformer which supplies the video signals to the video head and conducts them away therefrom through the shaft 32 and the discs 31 and 29, a very compact assembly is obtained that can be manufactured at low costs. The magazine of synthetic resin and/or the associated shafts and drums may be provided with a layer of hard metal such as chromium so that the amount of wear of the shafts and drum halves is limited to a minimum. The signals on the tape are invariably recorded and played back by the same heads so that no adjusting problems arise. If desired, use may be made of two or more video heads.

Consequently, the problem of the drum tolerances is also eliminated. The requirements imposed on the video heads are much less severe than was usual hitherto, since the time of use of a magazine will generally be shorter than that of a magnetic apparatus.

The box 2 and the lid 3 may be provided with fitting edges so that the two parts accurately fit one on the other and with securing means for firmly joining said parts.

FIGS. 4, 5, 6, 7, 8 and 9 show an alternative embodiment of the invention.

In a box 35 which may again be provided entirely or in part with a layer of chromium or of another hard metal accommodates a guide 36, a shaft 37 for a roller 38 and a shaft 39 for a lower spool 40. The box and one drum half 41 are obtained in one injection-moulding process. An erasing head 42 is arranged in the box.

A lid 43 of the same construction as the box 35 has a shaft 44 for a guiding roller 45. Provision is further made of a driving roller 46 which is located and driven in the magnetic apparatus and which co-operates with a pressure roller 47 likewise disposed in the magnetic apparatus and with a shaft 48 provided in the apparatus about which a spool 49 is adapted to rotate. Furthermore, a drum half 50 is joined to the lid 43, the axis of said drum-half being again in line with the axis of the drum half 41. The lid further accommodates a magnetic head 51 for recording and playing back sound and/or synchronizing vibrations. A tape 52 provided with a magnetizable layer extends from spool 40 along the roller 36 and the erasing head 42 to the drum halves 41 and 50 around which the tape is wound in a helical loop and then extends along the magnetic head 51, the roller 46 and the guiding roller 45 to the winding-up spool 49. The edges of the drum halves 41 and 50 facing each other are provided with ducts 53 in which a ring 54 (FIGS. 6 and 7) is adapted to rotate. This ring 54 supports a magnetic head 55 which is suitable for recording and playing back video signals. The ring 54 further has a cam 56. A disc 57 driven by the magnetic apparatus and provided with a cam 58 is adapted to rotate in this ring 54. The disc 57 further has a number of resilient contacts 59 which normally bear on the disc 57 and only one of which is shown in the figures. When the disc 57 rotates, the ring 54 is taken along by the cam 58 which can co-operate with cam 56. Due to the centrifugal forces, the contacts 59 are then thrown to the outside so that they get into contact with contacts on the ring 54 (not shown) which are in contact with the head 55.

This embodiment has the same advantages as the embodiment shown in FIGS. 1, 2 and 3; moreover, the head construction may be kept very light so that the acceleration forces remain small. When the spools, one or both of which can be driven by the magnetic apparatus as in the first embodiment, are arranged one above the other, the magazine can be smaller and of lighter weight so that the manufacturing costs are reduced. If both spools are driven, use is made of concentric shafts.

Figure 10:
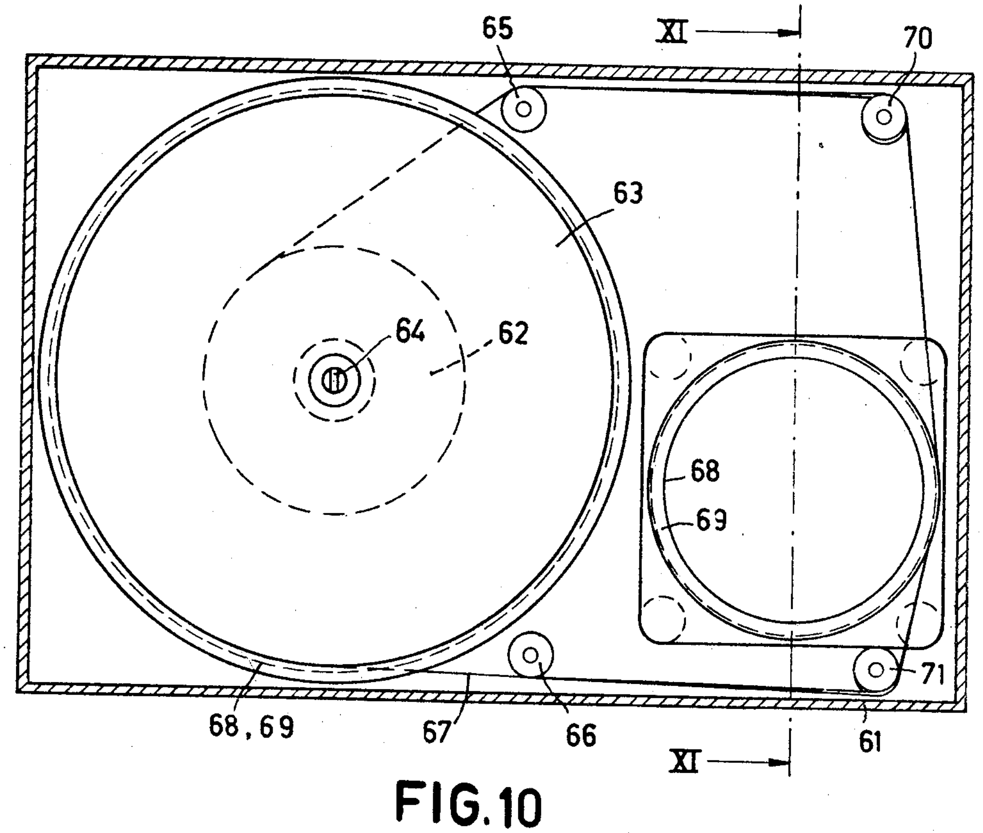
FIG. 10 is a (partly diagrammatic) plan view of a magazine of a magnetic recording and playback apparatus which includes a video-recording and -playback device of different construction.
Figure 11:
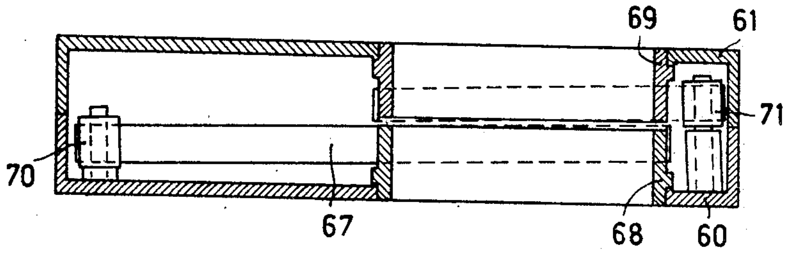
FIG. 11 is a sectional view of FIG. 10 taken on the line XI—XI, viewed in the direction of the arrow.

FIGS. 10 and 11 show a further embodiment of the invention.

In these figures, reference numerals 60 and 61 denote two parts of a magazine made of synthetic resin.

Two driven winding-up and winding-off spools 62 and 63 arranged one above the other are adapted to rotate about a shaft 64 which is secured in the magazine half 60 and the axis of which is at right angles to the base of the magazine. Guiding rollers 65 and 66 guide a tape provided with a magnetizable layer which can be wound onto or off the spools 62 and 63. The lower magazine half 60 accommodates a cylindrical drum half 68 the centre line of which extends at right angles to the base of the magazine half and hence is parallel to the centre lines of the shaft 64 and of the guiding rollers 65 and 66. The upper half 61 of the magazine accommodates a similar drum half 69 the centre line of which accurately coincides with the centre line of the drum half 68.

Furthermore, there are provided two guiding rollers 70 and 71 for the tape the axes of which are *not* at right angles to the base plate of magazine half 1 but are at such an angle to said base plate and hence to the centre lines of the spools 62 and 63 and the drum halves 68 and 69 that the tape, after being passed along one of said rollers, constitutes a helical loop wound around the drum halves, whereupon the other roller again ensures that the tape travels linearly. If desired, the axes of the rollers 70 and 71 may be secured to the base at an adjustable angle to said base.

This embodiment has the great advantage that the two magazine halves, which each accommodate a drum half, can be manufactured in a simpler manner, while the check of an accurate alignment of the centre lines of the drum halves is also considerably simplified. Especially if magazine halves and drum halves are made of synthetic resin, the after-effect, such as warp, shrinkage and the like, may be considerable. If the drum halves extend parallel to the spool axes, as shown in FIGS. 10 and 11, the manufacture and check are simple, while, as stated, the axes of the guiding and/or driving members for the tape, which mostly consist of simple rollers, may be adjustable so that the positions of said members can be adjusted in a simple manner.

It will be appreciated that the whole assembly of the device described is simple and that especially the desired small tolerance of the assembly hardly gives rise to difficulty.

The magazines shown are designed for a scanning rate of approximately 8 m./sec., a track width of the video signals of 150$\mu$ and a linear rate of travel of the tape of approximately 19 cm./sec. at a bandwith of 6.3 mm. Sound and synchronizing signals can then be written on the upper and lower part, respectively, of the tape with a track width of 200$\mu$. Sound-recording and erasing heads or heads for recording synchronizing signals are preferably provided, like in the embodiment shown in FIGS. 1, 2 and 3, with connecting contacts located on the outer side of the box so that when the magazine is introduced into the magnetic apparatus, the connections are automatically established.

The drum halves together with the magazine halves can be manufactured from synthetic resin by pressing or moulding; they may also be manufactured separately and fixedly secured to the magazine halves, if desired, after being metal-plated.

Though in the embodiment shown in FIGS. 4, 5, 6, 7, 8 and 9, the head is joined to a circular sledge, it stands to reason that this sledge may also have the form of a segment of a circle.

Though in this case the discs 29 and 31 are coupled by means of a toothed clutch, this clutch may be of any suitable shape. An electromagnetic coupling may also be used.

What is claimed is:

1. A magnetic tape magazine for the transducing of audio and video signals comprising: a magazine having a base and lid interconnected by side walls, at least two spools rotatably mounted within the magazine and adapted for accommodating a magnetic tape thereon which is engaged by external driving means and transported from one spool to the other spool; magnetic head means positioned along the path of the tape and adjacent thereto for transduction of audio signals, tape guiding means mounted within the magazine including two axially aligned cylindrical drum halves, for guiding the tape around the drum halves in a helical path, a gap defined by a separation along the cylindrical periphery of the two drum halves and at least one additional magnetic head rotatably positioned within the drum halves adjacent the gap and interacting with the helically wound tape for transduction of video signals.

2. A magnetic tape magazine as claimed in claim 1 wherein the aligned drum halves extend between the lid and the base and are positioned obliquely with respect to the base.

3. A magnetic tape magazine as claimed in claim 2 wherein there are two spools rotatably mounted on two respective and parallel shafts which extend perpendicularly between the lid and the base.

4. A magnetic tape magazine as claimed in claim 3 wherein the additional magnetic head is mounted on a disc and the disc is rotatably supported on a shaft.

5. A magnetic tape magazine as claimed in claim 2 wherein two spools are in juxtaposition and rotatably mounted in the magazine with their respective axes in alignment and extending perpendicularly between the lid and base of the magazine.

6. A magnetic tape magazine as claimed in claim 5 further comprising a ring member for supporting the additional magnetic head, ducts defined in the walls of the drum halves in the area of the gap for rotatably supporting the ring, a rotatably driven disc means positioned within the ring for engaging said ring to rotate and conductively contact same.

7. A magnetic tape magazine as claimed in claim 5 wherein the aligned drum halves extend perpendicularly between the lid and the base and further including guide roller means adjustably positionable in the magazine obliquely to the base and on both sides of the drum halves for guiding the tape in a helical path around the drum halves.

8. A magnetic tape magazine for use with an apparatus for transducing video signals and comprising a magazine having a base, a lid and interconnecting side faces; a wind-up and wind-off spool rotatably mounted within the magazine for accommodating a magnetic tape thereon which tape is transported on the spools by external driving means; guiding means included two aligned drum halves defining a peripheral gap therebetween, said gap being adapted to accommodate a magnetic head, tape guiding roller means positioned between the lid and base on either side of the drum halves for guiding the tape helically around the drum halves to cross the gap and to coact with a magnetic head during the helical transfer of the tape.

9. A magnetic tape magazine as claimed in claim 8 wherein the axes of wind-up and wind-off spools are parallel to each other and the axes of the tape guiding roller means and at right angles to the base of the magazine, and the aligned drum halves are mounted at an acute angle to the base.

10. A magnetic tape magazine as claimed in claim 8 wherein the wind-up and wind-off spools are arranged one above the other with coincident axes which are at right angles to the base of the magazine and parallel to the axes of the aligned drum halves; and the tape guiding roller means are adjustably mounted at an acute angle to the base.

References Cited

UNITED STATES PATENTS

| | | | |
|---|---|---|---|
| 1,631,137 | 6/1927 | Kincade | 179—100.2 |
| 2,424,498 | 7/1947 | Nygaard | 179—100.2 |
| 2,424,697 | 7/1947 | Lear | 179—100.2 |
| 2,484,552 | 10/1949 | Camras | 179—100.2 |
| 2,866,010 | 12/1958 | Dale | 179—100.2 |
| 3,107,280 | 10/1963 | Suetsugu | 179—100.2 |
| 3,202,771 | 8/1965 | Wada | 179—100.2 |

BERNARD KONICK, Primary Examiner

J. P. MULLINS, Assistant Examiner

U.S. Cl. X.R.

178—6.6; 242—198; 274—4